Sept. 14, 1943.  T. F. BANIGAN  2,329,239
METHOD OF AND MOLD FOR FORMING CELLULOSE SPONGES
Filed Aug. 2, 1940
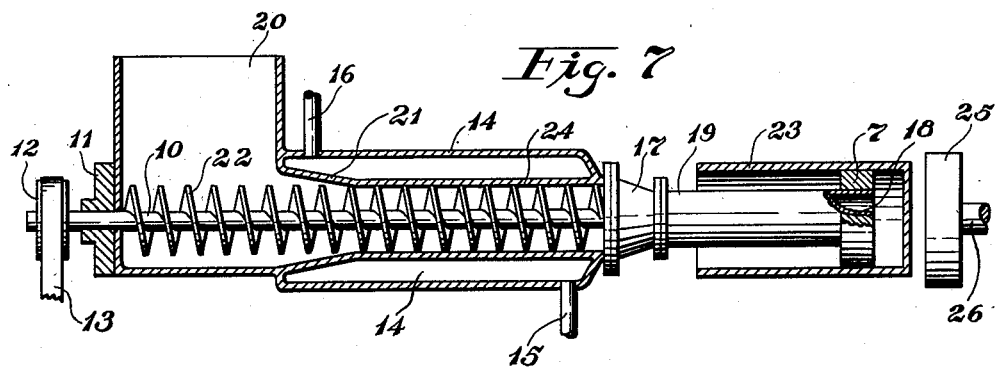
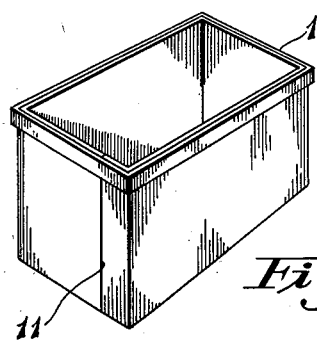
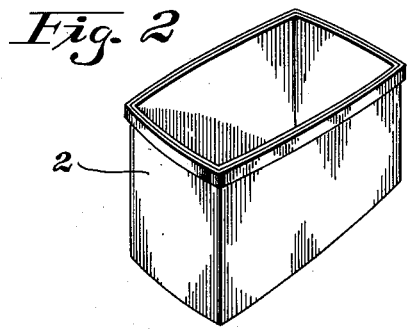
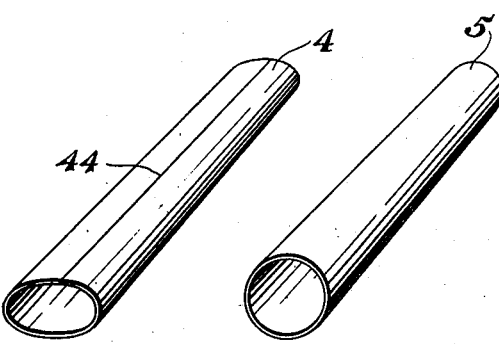
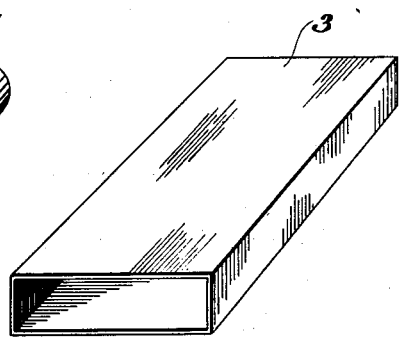
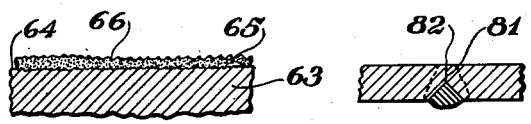
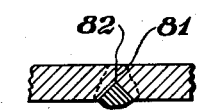
Thomas F. Banigan
INVENTOR
BY
ATTORNEY Patented Sept. 14, 1943

2,329,239

UNITED STATES PATENT OFFICE 2,329,239

METHOD OF AND MOLD FOR FORMING CELLULOSE SPONGES

Thomas F. Banigan, Kenmore, N. Y., assignor to E. I. du Pont de Nemours & Company, Wilmington, Del., a corporation of Delaware Application August 2, 1940, Serial No. 349,391

8 Claims. (Cl. 18—47)

This invention relates to artificial sponges, especially the manufacture of regenerated cellulose sponge from viscose. More particularly, it appertains to precluding shrinkage in the sponge mass in the mold during regeneration.

In a widely practiced procedure for the manufacture of regenerated cellulose sponge, a pasty mass is prepared by mixing together viscose, vegetable fibers (for example, hemp) and a pore-forming substance (for example, sodium sulfate decahydrate). The resulting mixture is then molded (for example, by being placed in a large metal container and pressed), and coagulated (for example, by heat and/or the chemical action of a coagulating solution). After coagulation the pore-forming substance is removed (for example, by washing or melting out), and the resulting block of sponge-like material washed, dried, and cut into units of the desired size and shape.

The development of the artificial sponge industry has been greatly hindered because of the inability to produce uniform sponge masses. The sponges ordinarily produced are anisotropic, particularly in the strength characteristics.

Non-uniform shrinkage and distortion, well known difficulties encountered in sponge manufacture have not been eliminated, although many advances in sponge manufacture have been made since commercial scale operation began. The treatments given molded sponge-forming masses in the past have resulted in dried sponge blocks having dimensions somewhat less than the dimensions of the mold in which they were processed. This disadvantage, which has been due to the shrinkage of the sponge upon drying, has been very serious because the shrinkage occurs unevenly, resulting in a distortion of the sponge block. In the case of a cubical mold, a sponge block having concave sides in which the concavities may amount to as much as 15% of the thickness of the block, is the usual product. In order to produce blocks of true parallelepiped shapes (having rectangular and related cross-sections), it is necessary to trim away a considerable amount of material. This waste obviously increases the cost of the finished product undesirably. Even this trimming has not resulted in a satisfactory product, because sponges of this character upon wetting swell non-uniformly and exhibit distortions in the wet condition. Such irregularities lessen to a great extent the appeal of such a product.

In the case of tubular molds, regardless of cross-section, that is, either rounded or polygonal, the deformation manifests itself in a necking-down of the sponge mass toward the ends of the mold. Sponge units obtained by sectioning or slicing these molded cylinders into pieces also have their costs undesirably increased because several of the end pieces must be discarded. Upon wetting, even the sections of proper size exhibit non-uniform swelling.

This invention had for an object the elimination or reduction of the non-uniformity of shrinkage encountered in the manufacture of regenerated cellulose sponge. Another object was to provide a mold surface which would eliminate shrinkage of an artificial sponge mass during processing. A general advance in the art, and other objects which will appear hereinafter, are also contemplated.

It has now been found that the shrinkage of sponge masses in the mold during processing can be satisfactorily prevented or obviated by utilizing molds in which the surfaces contacting the sponge mass are of sprayed metal.

From the following description and specific examples, in which are disclosed certain embodiments of the invention as well as details of what is believed to be the best mode for carrying out the invention, it will be apparent how the foregoing objects and related ends are accomplished. The written description is amplified by the accompanying drawing, in which:

Figures 1, 2, 3, 4 and 5 are isometric views of sponge molds of various types and shapes;

Figure 6 is a sectional view, partly broken away, of the sponge contacting surface of a mold of this invention;

Figure 7 is an elevation view partly in section of a molding apparatus; and

Figure 8 is a sectional view of a portion of a mold prior to treatment in accordance with the present invention.

Referring now to the drawing, a molding apparatus comprising extrusion press, nozzle and mold, is illustrated in Figure 7. The sponge mixture to be molded is placed in the hopper 20. This material, which has already been mixed to secure uniform distribution of the components, is forced under pressure from the hopper through the delivery end of the press, comprising a conical section 21 and a cylindrical barrel portion 24, by screw conveyor 22.

The shaft 10 of the worm 22 extends through the hopper wall and a bearing 11, and on its projecting end is fixed a pulley 12 which is driven by a belt 13. Power to operate the screw is supplied through this belt.

The tapered section 21, and the tubular part 24, are surrounded by the hollow jacket 14. By means of an inlet 15 and a outlet 16, a temperature controlling or regulating fluid, for example, water, can be circulated in this jacket to secure and/or maintain the desired temperature in the sponge mixture. A nozzle 19 is provided for guiding the sponge mixture into the mold 23, in which the sponge mixture is coagulated.

Connecting the delivery end of the press and the extrusion nozzle is a conical conduit section 17 which constricts the sponge mixture coming from the barrel 24, causing a merging of the separate helices of sponge mixture formed by the screw.

The nozzle 19 and/or its orifice 18 may be of any desired shape, but usually they conform, at least generally, to the cross-section of the mold. The mold, which is closed at one end as indicated, is tubular and may be of circular, oval, polygonal (especially square or rectangular) or any other desired cross-section.

In the molding operation, the mold to be filled is slipped over the flange 7 and positioned telescopically on the nozzle 19 with the bottom of the mold at the orifice 18. The desired amount of pressure on the sponge mixture in the mold is obtained with a supporting member 25, mounted on piston 26. This is brought to bear on the bottom of the mold before the filling operation starts.

The piston may be mounted in any desired manner, so long as the pressure which it applies to the bottom of the mold can be regulated. In one satisfactory form of apparatus, the piston is arranged to extend into a fluid-filled cylinder. As the mold is filled, it moves the member 25 back. This in turn forces the piston 26 into the aforementioned cylinder. The gas or liquid is allowed to escape from the cylinder through a release valve under controlled pressure. The cylinder can be refilled at an appropriate time, causing the piston to move the supporting member 25 against an empty mold.

The pressure applied by the screw 22 forcing the sponge mixture through the tubular parts 21, 24 and 17 and the nozzle 19 into the mold 23 against the member 25, causes the expulsion of most of the entrapped air in the mass.

When the sponge fills the mold completely (or to the desired extent), the latter is removed from the press and is immersed in a hot salt solution or placed in any other environment that will cause the viscose to coagulate or set. When the coagulation process is sufficiently advanced, the pore-forming material is removed by washing, and the sponge material removed from the mold. Then the regenerated cellulose block is washed, dried and/or subjected to other finishing treatments, after which it is cut and/or sliced into units of the desired size and shape. The purification operations may be carried out in the mold.

A conventional mold is shown at 1 in Figure 1. This type of mold is quite large, being approximately 18 inches in its long dimension, and enables the production of a sponge block which can be sawed into individual sponges of various sizes. It is sometimes desirable to form this general type of mold with bulged sides, and an illustration of such a modification is shown at 2 in Figure 2.

In some instances it is desirable to mold a sponge unit which needs to be sliced or cut in one direction only to produce a marketable unit. Molds suitable for this purpose are shown at 3, 4 and 5 in Figures 3, 4 and 5, respectively. The molded unit from these molds can be cut in a manner similar to slicing a loaf of bread, to give individual units of great utility.

The molds are usually formed from sheet metal electrically butt-welded. The welded seam is indicated at 11 and 44 in Figures 1 and 4, respectively. An enlarged view of such a weld is shown in Figure 8. The seam 81 has its interior edge ground flush with the surface of the face of the mold, as shown at 82.

According to this invention, the interior of the mold, that is, the surface which contacts the sponge mixture to be coagulated, is roughened by sand-blasting, followed by spraying with molten stainless steel. A greatly enlarged section of the resulting surface is shown in Figure 6. The side of the mold is shown at 63, the sand-blasted surface at 64, the sprayed stainless steel at 65, and the sponge-contacting surface at 66. In the preferred embodiment of the invention the surface 66 has a degree of roughness equal to standard No. 100 carborundum paper.

The spraying of the mold interior with the molten stainless steel may be carried out in any desired manner. One convenient method involves the conventional metal spraying gun similar to that illustrated in U. S. A. Patent No. 2,020,776 (Goebel). In operation a stainless steel wire is fed into the spray gun where it is melted by the action of a high temperature flame, for example, oxyacetylene. A stream of air under pressure passing through the gun carries the molten metal to the surface to be coated. The temperature of the molten metal exceeds its melting point only by a slight amount, so that it hardens rapidly after being sprayed.

Parts are given by weight throughout the application, unless otherwise specified.

*Example I*

A sponge mass comprising viscose, jute fibers and Glauber's salt in proportions giving a pasty mass, was thoroughly mixed by kneading and stirring. It was then charged into a rectangular stainless steel mold having a sprayed stainless steel inner surface, by means of an apparatus such as that illustrated in Figure 7.

The internal dimensions of the mold were 8 inches by 17 inches by 14 inches, the open side being 8 inches by 17 inches. The walls of the mold were $\frac{1}{16}$ inch thick. The interior surface of the mold was quite rough, being similar to that of No. 100 carborundum paper. It was prepared by thorough sand-blasting with carborundum particles passing through a standard 10-mesh screen and being held on a standard 30-mesh screen, followed by spraying with molten stainless steel.

After the mold was charged, the sponge mix therein was subjected to a pressure of 500 pounds per square inch in a hydraulic piston type press. The mold and its contents were then immersed in a 15% sodium sulfate solution at 95° C., and kept there for 16 hours. During this time the viscose coagulated, and the pore-forming crystals melted and dissolved. The mold was then removed from the coagulating tank and allowed to drain free from the excess of dissolved sodium sulfate solution. The sponge block was then withdrawn from the mold, washed, bleached and purified. After drying for 96 hours at 90° C., it was cut into small hand-size rectangular blocks of the desired dimensions. Before cutting, the dried block was found to have flat sides which were of approximately true rectangular shape.

When such blocks were immersed in and swollen with water, they retained their parallelepiped shape and flat sides. The same was true of the smaller units cut from such sponge blocks. They maintained all their form and regularity, even after swelling in water. In other words, the product obtained by the present invention had substantially uniform shrinkage characteristics.

The dimensions of the dried sponge block obtained in the manner described above, were 7⅛ inches by 16 inches by 12 inches. By way of comparison, a dried sponge block obtained from the same sponge mass in a mold of the same dimensions, having smooth inner surfaces, measured 6⅛ inches by 15½ inches by 12 inches. The sponge block of the present invention therefore showed an increase of 20.7% in volume. The very great economies effected by the present invention will be obvious. In addition, there was practically no waste in the cutting operation (because of the removal of deformed material).

*Example II*

A pasty sponge mass, similar to that of Example I, was charged into a tubular mold of oval cross-section having an inner surface of sprayed stainless steel. After a treatment such as outlined in Example I above, a dried sponge block of uniform oval cross-section was obtained. The cross-sectional area was greater than that of a similarly shaped sponge block obtained in the same manner from a mold of the same size having a smooth inner surface.

Many different types of sponge mixtures, different shapes of sponge molds, and ranges of mold pressures, are known to the art, and in the interest of brevity are not included in this specification.

Preferably the pasty sponge mass utilizes a viscose solution containing between 5% and 10% cellulose. The sodium sulfate decahydrate preferably comprises 50%-90% of the total sponge mix. Between 0.5% and 3% of fibers (jute, hemp, etc.), based on the total weight of the sponge mixture, have been found to give the most desirable results. The invention is not limited to the particular materials or compositions of the examples, but applies broadly to all suitable mixtures known to the art. It therefore includes different pore-forming materials, different fibrous materials, and different concentrations of viscose solutions.

The present invention has been found to operate satisfactorily, regardless of the shape of the mold. The most commonly employed molds are of a parallelepiped shape having square or rectangular sides, and tubular shape having oval cross-sections. The dimensions and shapes are dependent upon the form of the product desired. The mold should not be so large that heat and treating media will fail to reach the interior of the sponge mass during the period of treatment. In some instances it may be desirable to utilize a tubular mold of ornamental shape rather than the rectangular, square, round, oval, and like cross-sections which are desired more for utilitarian purposes.

The pressure to which the plastic mass, after being charged into the mold, is subjected, is preferably within the range 5 to 200 pounds per square inch. It should be sufficient to produce a compact mass and to cause expulsion of most of the entrapped air therefrom.

The molds are preferably constructed of some acid and alkali resistant metal. Rolled stainless steel sheet approximately $\frac{1}{16}$ inch in thickness has been found to be very satisfactory. The common corrosion resistant material commonly known as 18-8 alloy (comprising chromium and nickel in addition to iron) has been found to be quite suitable. In some instances ordinary iron and steel molds may be used, depending upon the composition of the sponge mixture, the treating media, and the products of regeneration of the mixture. The cheapest material which will withstand the corroding agencies encountered in a particular process is a desideratum.

The mold is preferably prepared by butt-welding the metal into proper form, smoothing the inner faces of the welds, as by grinding, to conform to the inner surface of the mold, sand-blasting to form an anchoring surface for the coating, and then coating by spraying with molten metal. In the sand-blasting step, granular abrasives such as sharp quartz particles, fused aluminum oxide, carborundum particles, and the like, in sizes ranging from 10-mesh to standard 50-mesh, have been found especially suitable. Treatment with such material gives a sand-blasted surface comparable in roughness to standard 220 carborundum paper. When the entire surface of the mold has been thoroughly sand-blasted in this manner, there results a surface into which the sprayed stainless steel coating blends satisfactorily. The inner surface of the mold may be prepared to receive the sprayed metal, though not as desirably, by such means as embossing with rolls, etc., etching with acids or other materials which are corrosive to the surface of the mold, rubbing with emery cloth, and dressing with emery wheels.

Many advantages will be apparent from the foregoing description. The sponges produced according to this invention have improved properties, particularly a reduction in non-uniformities. Sponge blocks of the present invention swell uniformly upon wetting, and shrink uniformly, and as a result have greatly enhanced sales appeal. The present invention results in a great reduction in waste in the preparation of sponge material for the market.

In résumé, the present invention enables the production of sponge blocks and sponge cylinders possessing uniform swelling and shrinkage characteristics which correspond closely to the shape of the mold in which they are formed. In addition, the sponge cylinders do not have reduced end-perimeters.

As many apparently widely different embodiments of this invention may be made without departing from the spirit and scope thereof, it is to be understood that this invention is not limited to the specific embodiments thereof except as defined in the appended claims.

I claim:

1. A sponge mold having a sponge mix contacting surface of sprayed stainless steel, said surface having a roughness like No. 100 carborundum paper.

2. A regenerated cellulose sponge mold consisting of an open container of acid and alkali resistant sheet metal approximately $\frac{1}{16}$ inch thick, having a sponge mix contacting surface of sprayed metal, the roughness of which is equivalent to No. 100 carborundum paper.

3. A regenerated cellulose sponge mold consisting of an open container of stainless steel sheet approximately $\frac{1}{16}$ inch thick, having a sponge mix contacting surface of sprayed stainless steel, the roughness of which is equivalent to No. 100 carborundum paper.

4. A regenerated cellulose sponge mold consisting of an open container of acid and alkali resistant sheet metal approximately $\frac{1}{16}$ inch thick, having a sponge mix contacting surface of sprayed stainless steel, the roughness of which is equivalent to No. 100 carborundum paper.

5. The process which comprises coagulating a sponge mix in a mold having a sprayed metal sponge contacting surface whose roughness is like No. 100 carborundum paper.

6. The process which comprises coagulating a sponge mix in a mold having a sprayed stainless steel sponge contacting surface, the roughness of which is like No. 100 carborundum paper.

7. The process which comprises coagulating a sponge mix in a mold having a sprayed stainless steel sponge contacting surface, the texture of which is like No. 100 carborundum paper, said mold being of sheet metal approximately $\frac{1}{16}$ inch thick.

8. The process which comprises charging a sponge mold having internal dimensions 8 inches x 17 inches x 14 inches, open on one 8 x 17 inch side, with a regenerated cellulose sponge mix comprising essentially viscose, jute fibers and Glauber's salt in proportions to give a pasty mass, the said mold being constructed of stainless steel sheet approximately $\frac{1}{16}$ inch thick having a sponge mix contacting surface of sprayed stainless steel of a roughness similar to that of No. 100 carborundum paper, immersing the mold and its contents in 15% sodium sulfate solution, and maintaining it therein at 95° C. for 16 hours.

THOMAS F. BANIGAN.